(12) United States Patent
Okamura

(10) Patent No.: US 7,236,270 B2
(45) Date of Patent: Jun. 26, 2007

(54) METHOD OF SETTING REFERENCE DATA OF SHADING CORRECTIONS, AND IMAGE READING APPARATUS

(75) Inventor: Yukio Okamura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 977 days.

(21) Appl. No.: 10/241,222

(22) Filed: Sep. 10, 2002

(65) Prior Publication Data

US 2003/0072040 A1    Apr. 17, 2003

(30) Foreign Application Priority Data

Sep. 11, 2001  (JP) ............................ P2001-275207

(51) Int. Cl.
 *H04N 1/00*  (2006.01)
(52) U.S. Cl. .................... 358/406; 358/461; 358/443; 358/463; 358/519; 358/514; 358/509; 358/504; 358/505; 358/475; 382/274; 382/254; 382/275
(58) Field of Classification Search ............... 358/461, 358/443, 463, 518, 519, 514, 513, 509, 504, 358/505, 483, 475, 406, 474; 382/274, 254, 382/275
See application file for complete search history.

(56) References Cited

U.S. PATENT DOCUMENTS

| | | | | |
|---|---|---|---|---|
| 5,067,168 A | * | 11/1991 | Nagano ..................... | 382/273 |
| 5,099,341 A | * | 3/1992 | Nosaki et al. ............. | 358/461 |
| 5,442,464 A | * | 8/1995 | Ito ............................. | 358/482 |
| 5,644,409 A | * | 7/1997 | Irie et al. ................... | 358/461 |
| 5,907,742 A | * | 5/1999 | Johnson et al. ............ | 399/51 |
| 6,043,880 A | * | 3/2000 | Andrews et al. ........... | 356/311 |
| 6,229,627 B1 | * | 5/2001 | Taguchi et al. ............ | 358/461 |
| 6,323,933 B1 | * | 11/2001 | Anzai ......................... | 355/23 |
| 6,330,083 B1 | * | 12/2001 | Nabeshima et al. ....... | 358/474 |
| 6,631,209 B1 | * | 10/2003 | Kanamori ................... | 382/169 |
| 6,700,683 B1 | * | 3/2004 | Hashizume ................ | 358/461 |
| 6,765,696 B1 | * | 7/2004 | Motominami et al. ..... | 358/471 |
| 7,119,932 B2 | * | 10/2006 | Sato et al. .................. | 358/474 |

(Continued)

FOREIGN PATENT DOCUMENTS

JP        60-180377        * 9/1985

(Continued)

*Primary Examiner*—Aung S. Moe
*Assistant Examiner*—Beniyam Menberu
(74) *Attorney, Agent, or Firm*—John J. Penny, Jr.; Steven M. Cohen; Edwards Angell Palmer & Dodge LLP

(57) ABSTRACT

A white reference image is inputted to an image sensor with a light source lit up, and white reference data is set every effective photosensor element by inspecting the output signals of the image sensor as to the white reference image (steps S305 and S310). After the input of the white reference image, the light source is extinguished (point e in FIG. 1), a black reference image is inputted to the image sensor (step S315), and black reference data is set every effective photosensor element by inspecting the output signals of the image sensor as to the black reference image (step S320). After the light source is lit up (point f in FIG. 1), the optical image of a subject is inputted to the image sensor, and image data outputted to shading corrections with the white reference data and the black reference data are outputted (step S330)

12 Claims, 8 Drawing Sheets

U.S. PATENT DOCUMENTS

2003/0081264 A1* 5/2003 Kumano et al. ............ 358/461

FOREIGN PATENT DOCUMENTS

| JP | 03-096171 | | 4/1991 |
|----|-----------|---|--------|
| JP | 10-075353 | * | 3/1998 |
| JP | 11-098329 | | 4/1999 |
| JP | 2001-016415 | | 1/2001 |

* cited by examiner

METHOD OF SETTING REFERENCE DATA OF SHADING CORRECTIONS, AND IMAGE READING APPARATUS

BACKGROUND OF THE INVENTION

The present invention relates to a method of setting the reference data of shading corrections, and an image reading apparatus.

Heretofore, in an image reading apparatus, shading corrections have been implemented for output signals delivered as to individual photosensor elements mounted on an image sensor.

In implementing the shading corrections, reference data called "black reference data" and "white reference data" are employed. Before the image reading apparatus performs the operation of reading a subject such as photographic film, photograph, or printed document, it sets the black reference data and the white reference data by inputting a white reference image and a black reference image and then inspecting the output signals of the image sensor.

FIG. 4 is a diagram showing the relationship between the flow of a related-art process for reading a subject by setting white reference data and black reference data and a luminous intensity on that occasion. As shown in FIG. 4, in the related art, the black reference data are first set, and the white reference data are thereafter set. In the setting of the black reference data, there are performed the processing (step S205) of inputting a black reference image to an image sensor with a light source extinguished (point a in FIG. 4), and the processing (step S210) of setting the black reference data every photosensor element by inspecting the output signals of an image sensor as to the inputted black reference image. At a stage (point b in FIG. 4) when the processing of inputting the black reference image has ended, the light source is lit up. The luminous intensity of the light source lit up increases to a certain value monotonously with the lapse of time and is stabilized (point c in FIG. 4). When the setting of the black reference data has ended, and besides, the luminous intensity has been stabilized, the white reference data are subsequently set (step S220). In the setting of the white reference data, there are performed the processing of inputting a white reference image to the image sensor in a state where the light source is lit up, and the processing of setting the white reference data every photosensor element by inspecting the output signals of the image sensor as to the inputted white reference image. After the setting of the white reference data has ended, the processing of inputting the optical image of a subject to the image sensor and outputting image data outputted to shading corrections with the white reference data and the black reference data is started (step S225) in the state where the light source is lit up.

Since the errors of the white reference data exert serious influence on an image quality, the setting of the white reference data (step S220) is started after a sufficient wait since the lighting-up of the light source till the stabilization of the luminous intensity.

In general, the light source requires a time period of several seconds to dozens seconds since the lighting-up till the stabilization of the luminous intensity. Therefore, a long time is involved since the light source is lit up upon the end of the processing of inputting the black reference image, until the setting of the white reference data is started. This results in the problem that a time period before the start of the reading of the subject becomes long.

SUMMARY OF THE INVENTION

The present invention has been created in order to solve the above problem, and has for its object to provide a method of setting the reference data of shading corrections and an image reading apparatus as shorten a time period required since the start of the setting of the reference data for use in the shading corrections, till the start of reading.

In order to solve the aforesaid object, the invention is characterized by having the following arrangement.

(1) A method of setting reference data of shading corrections comprising:

a white reference image input step of inputting a white reference image to an image sensor with a light source lit up;

a white reference setting step of setting white reference data every effective photosensor element by inspecting output signals of the image sensor as to the white reference image;

a black reference image input step of inputting a black reference image to the image sensor with the light source extinguished after the white reference image input step;

a black reference setting step of setting black reference data every effective photosensor element by inspecting output signals of the image sensor as to the black reference image; and a reading step of inputting an optical image of a subject to the image sensor with the light source lit up, and outputting image data outputted to the shading corrections with the white reference data and the black reference data.

(2) The method according to (1), wherein the white reference setting step includes a first step of setting tentative black reference data by inspecting output signals with the light source lit up, as to light-shielded photosensor elements of the image sensor, and a second step of setting the white reference data with the tentative black reference data.

(3) The method according to claim (2), wherein at the first step of the white reference setting step, an accumulation time of signal charges of the image sensor is controlled to be shorter than that of signal charges of the image sensor at the reading step.

(4) The method according to (1), wherein at the black reference image input step, the black reference image is inputted to the effective photosensor elements a plurality of times; and at the black reference setting step, the output signals of the image sensor are inspected a plurality of times as to the black reference image, and the black reference data are set on the basis of an average of the output signals of each effective photosensor element.

(5) The method according to (4), wherein at the black reference image input step, the black reference image is inputted to the effective photosensor elements at least 100 times; and at the black reference setting step, the output signals of the image sensor are inspected at least 100 times as to the black reference image.

(6) An image reading apparatus comprising:

an image sensor which includes a plurality of photosensor elements;

an optical system which includes a light source for illuminating a subject, and which inputs an optical image to the image sensor;

a processing unit which outputs image data expressive of the optical image on the basis of output signals of the image sensor;

a white reference image input unit for inputting a white reference image to the image sensor with the light source lit up;

a white reference setting unit for setting white reference data every effective photosensor element by inspecting the output signals of the image sensor as to the white reference image;

a black reference image input unit for inputting a black reference image to the image sensor with the light source extinguished after the white reference image has been inputted;

a black reference setting unit for setting black reference data every effective photosensor element by inspecting the output signals of the image sensor as to the black reference image; and a reading unit for inputting the optical image of the subject to the image sensor with the light source lit up, and causing the processing unit to output the image data outputted to shading corrections with the white reference data and the black reference data.

(7) The image reading apparatus according to (6), wherein, the image sensor includes photosensor elements which are shielded from light; and the white reference setting unit sets tentative black reference data by inspecting output signals with the light source lit up, as to the light-shielded photosensor elements, and sets the white reference data with the tentative black reference data.

(8) The image reading apparatus according to (7), wherein the white reference setting unit controls an accumulation time of signal charges of the image sensor to be shorter than that of the image sensor when the reading unit inspects the output signals of the image sensor as to the light-shielded photosensor elements.

(9) The image reading apparatus according to (6), wherein the black reference image input unit inputs the black reference image to the effective photosensor elements a plurality of times; and the black reference setting unit inspects the output signals of the image sensor a plurality of times as to the black reference image, and sets the black reference data on the basis of an average of the output signals of each effective photosensor element.

(10) The image reading apparatus according to (9), wherein the black reference image input unit inputs the black reference image to the effective photosensor elements at least 100 times; and the black reference setting unit inspects the output signals of the image sensor at least 100 times as to the black reference image.

DETAILED DESCRIPTION OF PREFERRED EMBODIMENTS

Now, the construction of an image scanner 10 of an image reading apparatus according to an embodiment of the present invention will be described with reference to FIGS. 2 and 3.

Figure 2:
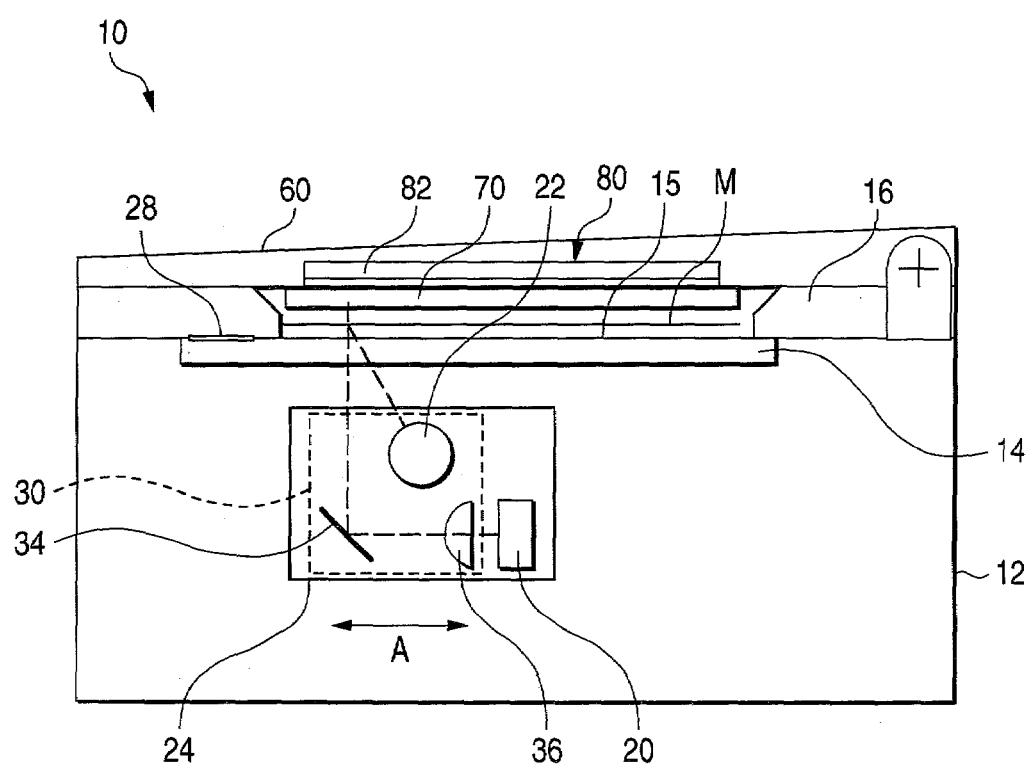
FIG. 2 is a schematic view showing an image scanner embodying the present invention.

FIG. 2 is a schematic view showing the image scanner 10 as one embodiment of the image reading apparatus according to the present invention. The image scanner 10 is of so-called "flatbed type" which includes an original table 14 at the top of a body 12 of rectangular parallelepiped.

The original table 14 is formed of a substantially rectangular transparent plate such as glass plate, and a subject M such as photographic film, photograph or printed document is put on the surface 15 of the original table 14. An original guide 16 which is in the shape of a substantially rectangular frame, is joined to the peripheral edge part of the original table 14. The original guide 16 abuts against the subject M, and positions the subject M onto the surface 15 of the original table 14. A white reference plate 28 which extends in a main scanning direction, is joined to the original guide 16. The white reference plate 28 has a uniform reflection surface of high reflectivity.

An original cover 60 is pivotally coupled to the body 12. The original cover 60 holds the subject M put on the original table 14, and it conceals the original table 14 in order that light other than the emission light of a light source 22 for a reflective original or a light source 80 for a transmissive original may be prevented from illuminating the subject M. An original mat 70 is detachably attached in engagement with the original cover 60. The original mat 70 is attached to the original cover 60 in case of reading the reflective original, whereas it is detached from the original cover 60 in case of reading the transmissive original. The original mat 70 has its shape and mounting position set so as to conceal a light diffusion plate 82 when it is attached to the original cover 60, and to expose the light diffusion plate 82 when it is detached from the original cover 60.

The transmissive-original light source 80 is accommodated in the original cover 60. This transmissive-original light source 80 is configured of a tubular illumination device such as fluorescent tube lamp, the light diffusion plate 82 and a reflection plate. The tubular illumination device not shown is mounted on the original cover 60 in an attitude in which the longitudinal axis thereof extends in parallel with the reciprocating direction of a carriage 24. The light diffusion plate 82 is made of a semitransparent, light guide plate of substantially rectangular shape being parallel to the pivotal axis of the original cover 60, and it diffuses and transmits light falling thereon from the tubular illumination device or the reflection plate. The reflection plate not shown is formed in the shape of a sheet curved like a half pipe, and it is mounted on the original cover 60 in an attitude in which the longitudinal axis thereof is parallel to that of the tubular illumination device. This reflection plate reflects the emission light of the tubular illumination device toward the light diffusion plate 82. The transmissive original such as photographic film is illuminated by the transmissive-original light source 80. Thus, it is permitted to scan the transmissive original.

The carriage 24 is accommodated in the body 12 so as to freely reciprocate in parallel with the surface 15 of the original table 14. An optical system 30 and an image sensor 20 are provided in the carriage 24. The carriage 24 is slidably held in engagement with a guiding shaft or the like which is parallel to the surface 15 of the original table 14. The longitudinal axis of the guiding shaft is stretched in a direction A indicated in FIG. 2. The carriage 24 is pulled by, for example, a belt so as to transport the image sensor 20 and the optical system 30 in the direction A in FIG. 2.

The optical system 30 is configured of the reflective-original light source 22, a mirror 34, a condensing lens 36, etc. The reflective-original light source 22 is constructed of a tubular illumination device such as fluorescent tube lamp. This reflective-original light source 22 is provided in the carriage 24 in an attitude in which the longitudinal axis thereof extends in parallel with that of the image sensor 20. As indicated by broken lines in FIG. 2, a reflected light image on the main scanning line of the subject M illuminated by the reflective-original light source 22 and/or a transmitted light image on the main scanning line of the subject M illuminated by the transmissive-original light source 80 are/is focused on the image sensor 20 by the mirror 34 and the condensing lens 36.

Figure 3:
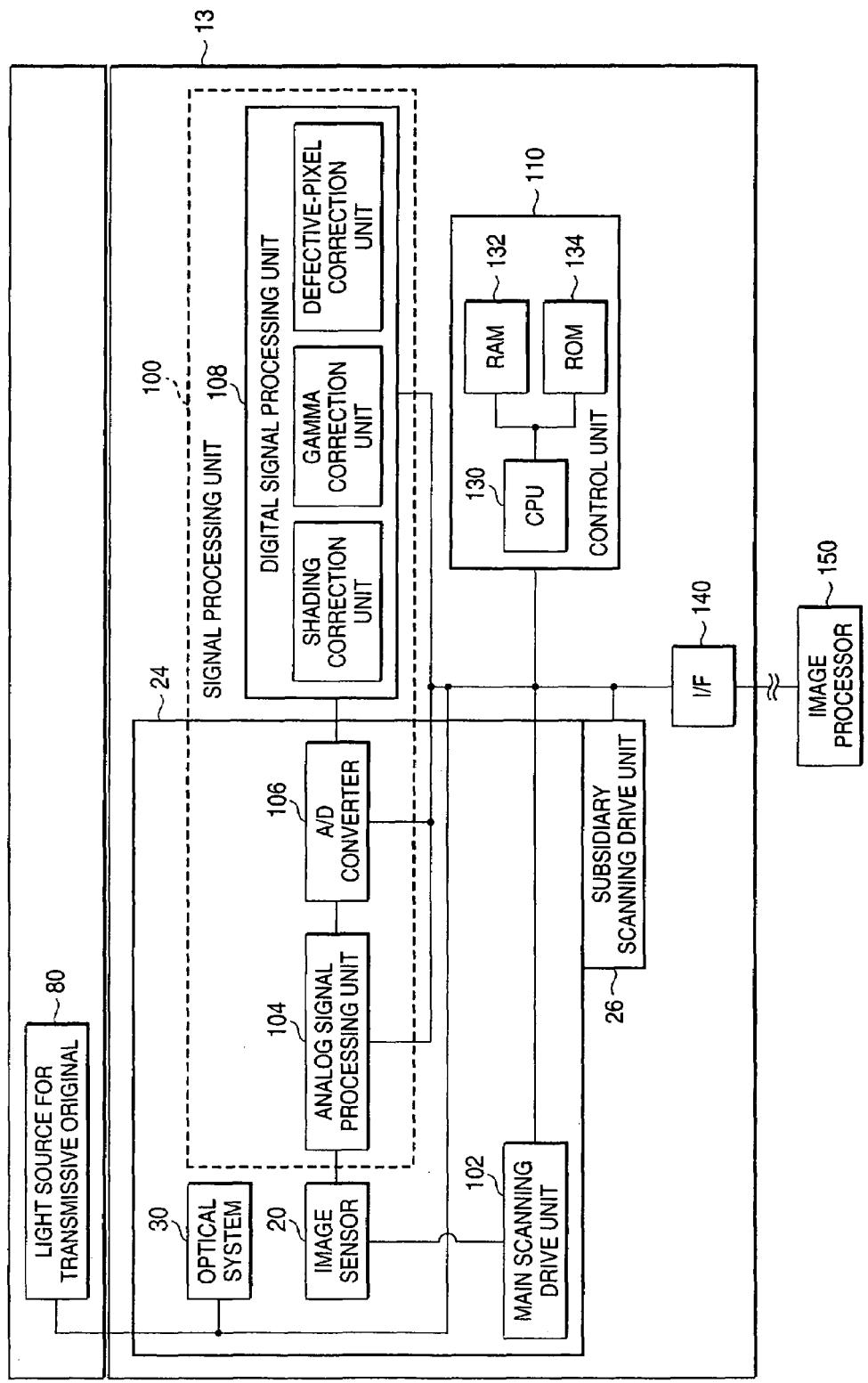
FIG. 3 is a block diagram showing the image scanner embodying the present invention.
Figure 4:
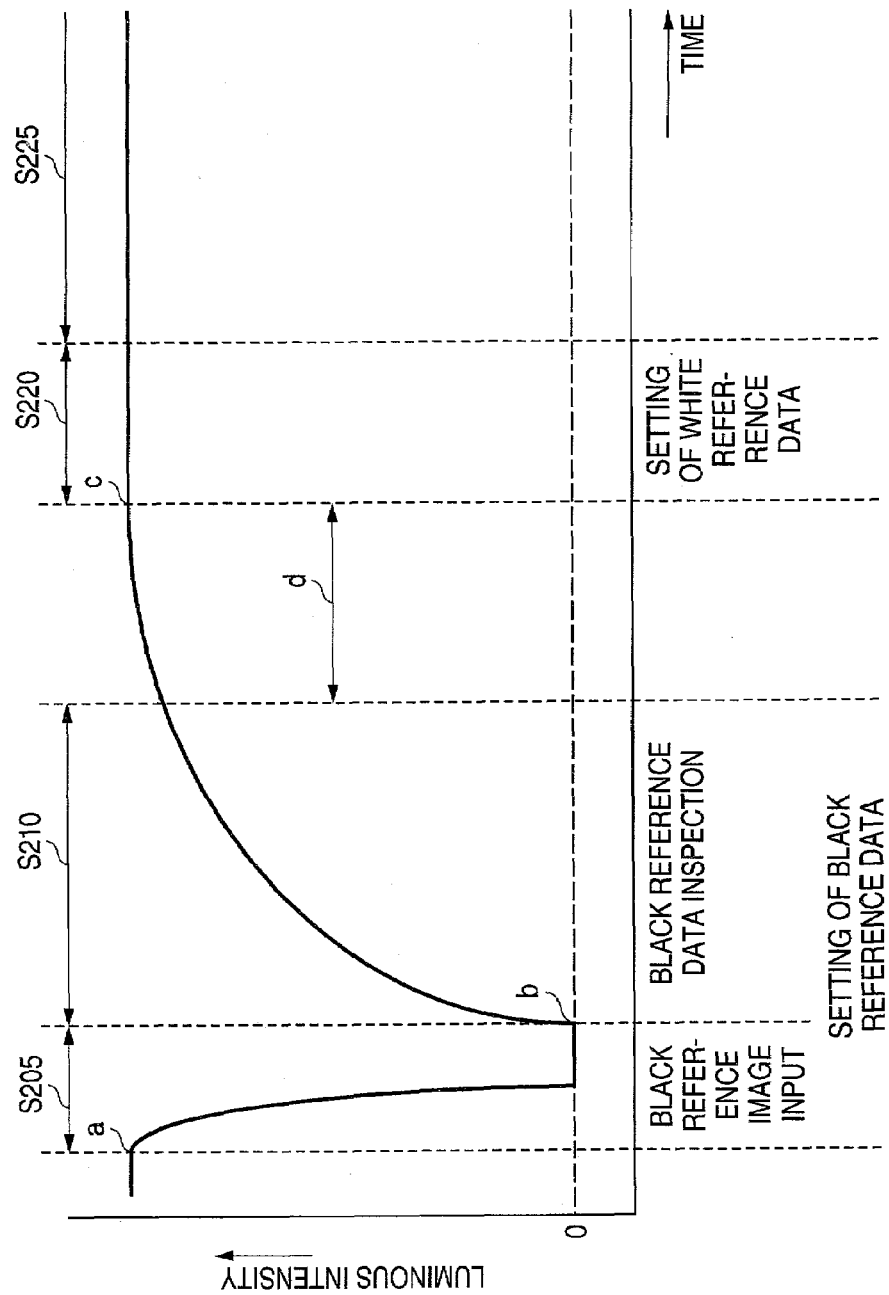
FIG. 4 is a diagram showing the relationship between the flow of a prior-art process for setting white reference data and black reference data and a luminous intensity on that occasion.

FIG. 3 is a block diagram showing the image scanner 10.

The image sensor 20 is provided in the carriage 24 in an attitude in which a plurality of photosensor elements such as photodiodes are arrayed rectilinearly in a direction perpendicular to the sheet of drawing as viewed in FIG. 2. The image sensor 20 scans the optical image on the main scanning line as inputted by the optical system 30, and it outputs electric signals correlative to the density of the optical image. More specifically, the image sensor 20 accumulates for a certain time period, charges which are obtained through the photoelectric conversion of light of predetermined wavelength region, such as visible radiation, infrared radiation or ultraviolet radiation, and it outputs the electric signals corresponding to the quantities of light received by the respective photosensor elements, by employing CCDs (Charge Coupled Devices), MOS transistor switches or the likes. Either a lens reduction type or a contact type may be employed as the image sensor 20. It is also allowed to employ a color image sensor of 3- or 6-line configuration including a color filter array. The image sensor 20 includes effective photosensor elements which correspond to pixels constituting image data outputted in the mode of reading the subject M, and 60 photosensor elements which are shielded from light beforehand. Output values delivered as to the light-shielded photosensor elements are used for setting tentative black reference data to be stated later. Incidentally, although the photosensor elements shielded from light beforehand are employed in this embodiment, the effective photosensor elements may well be temporarily shielded from light in inputting a black reference image.

A main scanning drive unit 102 is provided in a substrate which is fixed to the carriage 24. The main scanning drive unit 102 is a drive circuit which supplies the image sensor 20 with drive pulses necessary for driving the image sensor 20. This main scanning drive unit 102 is constructed of, for example, a synchronizing signal generator or a driving timing generator. It can control the accumulation time of the signal charges to be accumulated in the image sensor 20, by adjusting intervals at which the drive pulses are outputted.

A subsidiary scanning drive unit 26 is configured of the belt held in engagement with the carriage 24, a motor and a gear train for rotating the belt, a drive circuit, etc., and it is accommodated in the body 12. The subsidiary scanning drive unit 26 pulls the carriage 24 by the belt, whereby the main scanning line extending perpendicularly to the sheet of drawing as viewed in FIG. 2 is moved in the direction A perpendicular thereto. It is therefore permitted to scan a two-dimensional image.

A signal processing unit 100 is configured of an analog signal processing unit 104, an A/D converter 106, a digital signal processing unit 108, etc. The signal processing unit 100 processes the output signals of the image sensor 20, and outputs the image data expressive of the optical image inputted to the image sensor 20 by the optical system 30. The analog signal processing unit 104 is provided in the substrate which is fixed to the carriage 24. This analog signal processing unit 104 outputs the electric signals of analog expression outputted from the image sensor 20, to analog signal processes such as amplification and a noise reduction process, and outputs the processed signals. The A/D converter 106 is provided in the substrate which is fixed to the carriage 24. This A/D converter 106 quantizes the electric signals of analog expression outputted from the analog signal processing unit 104, into image signals of digital expression having a predetermined bit length, and outputs the quantized signals. The digital signal processing unit 108 is provided in a substrate which is fixed to the housing 13 of the body 12. This digital signal processing unit 108 includes a shading correction unit, a gamma correction unit and a defective-pixel correction unit. Thus, the digital signal processing unit 108 outputs the image signals outputted from the A/D converter 106, to various digital signal processes such as shading corrections, gamma corrections and pixel interpolations, thereby to create the image data. Incidentally, the various processes in the digital signal processing unit 108 may well be replaced with processes based on computer programs which are run by an image processor 150, such as personal computer, connected to a control unit 110 or the image scanner 10.

The control unit 110 is constructed of a microcomputer including a CPU 130, a RAM 132 and a ROM 134, and is provided in the substrate fixed to the housing 13 of the body 12. The control unit 110 is connected to the drive circuits of the reflective-original light source 22 and transmissive-original light source 80, the main scanning drive unit 102, the subsidiary scanning drive unit 26, the signal processing unit 100, etc. through buses. This control unit 110 runs computer programs stored in the ROM 134, in compliance with the commands of the image processor 150, thereby to control the reflective-original light source 22, transmissive-original light source 80, main scanning drive unit 102, subsidiary scanning drive unit 26, signal processing unit 100, etc. Programs which concern the settings of white reference data, black reference data and the tentative black reference data, are also contained in the computer programs stored in the ROM 134. The CPU 130 runs these programs, thereby to perform also processes concerning the settings of the white reference data, black reference data and tentative black reference data, such as the integration of the output values delivered as to the photosensor elements, the calculation of an average value, and loading into the RAM 132.

An interface 140 is constructed in conformity with a predetermined standard such as "USB" or "IEEE 1394", and it is provided in the substrate fixed to the housing 13 of the body 12. The interface 140 is connected to the signal processing unit 100, the control unit 110, etc. by buses. This interface 140 transfers the image data outputted from the signal processing unit 100, to the image processor 150.

Thus far, the construction of the image scanner 10 which is one embodiment of the image reading apparatus according to the present invention has been described with reference to FIGS. 2 and 3.

In general, the transmissive original such as photographic film contains many regions of dark parts where the differences of gradations are small. Therefore, the black reference data exert great influence especially on the image quality of the image data outputted by reading the transmissive original. In the ensuing description, accordingly, the case of reading the transmissive original will be taken as an example.

Now, there will be described the relationship between the flow of a process for setting white reference data and black reference data in this embodiment and a luminous intensity on that occasion.

Figure 1:
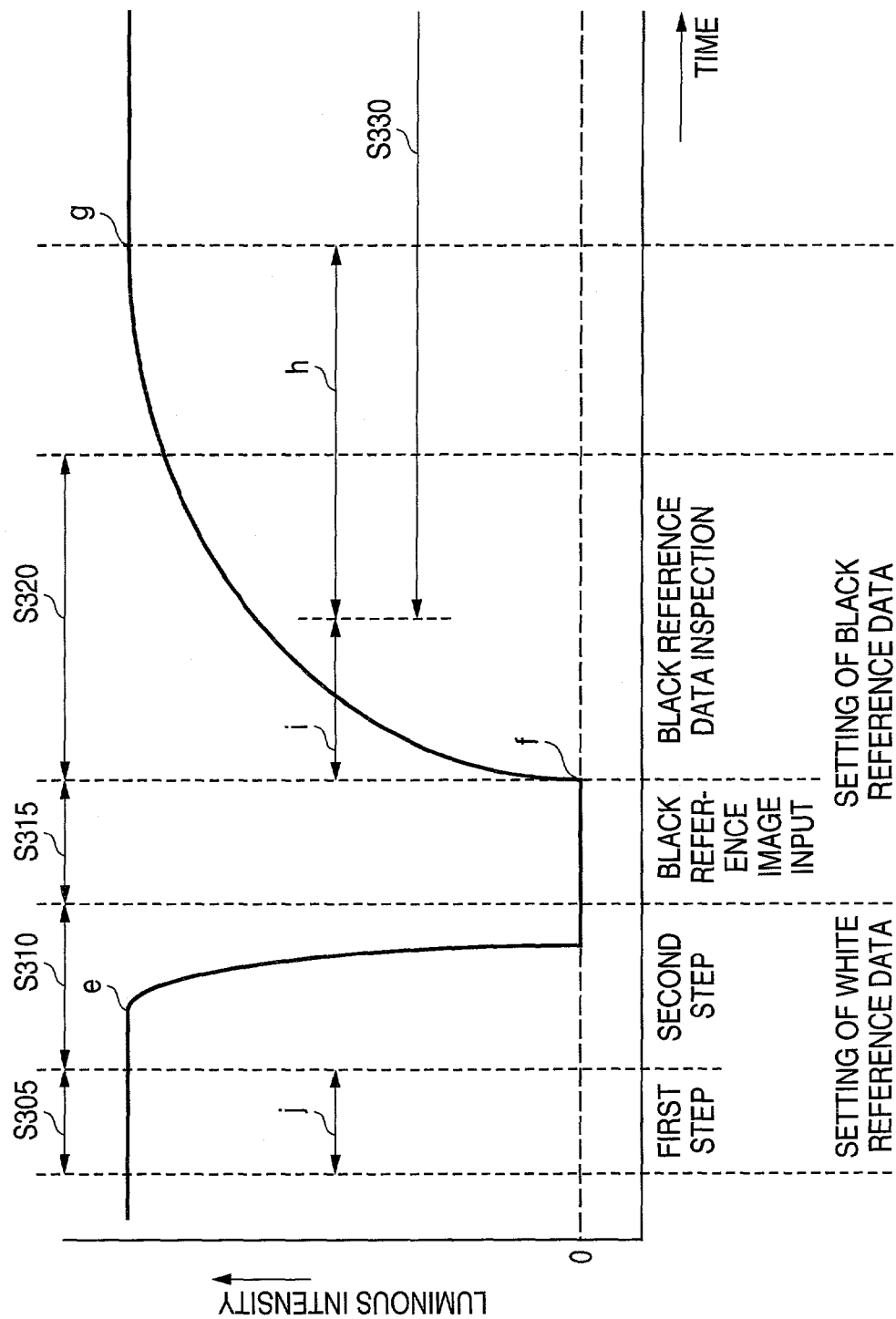
FIG. 1 is a diagram showing the relationship between the flow of a process for setting white reference data and black reference data in an embodiment and a luminous intensity on that occasion.

FIG. 1 is a diagram showing the relationship between the flow of a process for reading a subject by setting the white reference data and the black reference data in this embodiment and the luminous intensity of the transmissive-original light source 80 on that occasion. The process is started upon receiving an instruction for reading the subject, from the image processor 150. By the way, in this process, the white reference data and the black reference data are set each time before reading the subject, for the reason that conditions such as the brightness of the light source change. As shown in FIG. 1, the white reference data are set earlier, and the black reference data are thereafter set. The setting of the white reference data consists of the first step (step S305) of setting tentative black reference data by inspecting output signals with the transmissive-original light source 80 lit up, as to photosensor elements shielded from light, and the second step (step S310) of setting the white reference data by using the tentative black reference data. At the second step, there are performed the processing of inputting a white reference image to the image sensor 20 with the transmissive-original light source 80 lit up, and the processing of setting the white reference data every effective photosensor element by inspecting the output signals of the image sensor 20 as to the inputted white reference image. The transmissive-original light source 80 is extinguished when the processing of inputting the white reference image has ended (point e in FIG. 1). The completion of the setting of the white reference data is followed by the setting of the black reference data. In the setting of the black reference data, there are performed the processing (step S315) of inputting a black reference image to the image sensor 20 in the state where the transmissive-original light source 80 is extinguished, and the processing (step S320) of setting the black reference data every photosensor element by inspecting the output signals of the image sensor 20 as to the inputted black reference image The transmissive-original light source 80 is lit up at a stage (point f in FIG. 1) when the processing of inputting the black reference image has ended. The luminous intensity of the transmissive-original light source 80 lit up increases to a certain value monotonously with the lapse of time and is stabilized (point g in FIG. 1). When a predetermined time period (time period i in FIG. 1) has lapsed since the lighting-up of the transmissive-original light source 80, the process for reading the subject is started (step S330) without waiting the fact that the luminous intensity of the transmissive-original light source 80 reaches the maximum. Therefore, the luminous intensity of the transmissive-original light source 80 increases monotonously with the lapse of time for a while after the start of the input of an optical image.

Thus far, there has been described the relationship between the flow of the process for reading the subject by setting the white reference data and the black reference data in this embodiment and the luminous intensity on that occasion. Operations which incarnate the respective steps in FIG. 1 will be described below.

Figure 5:
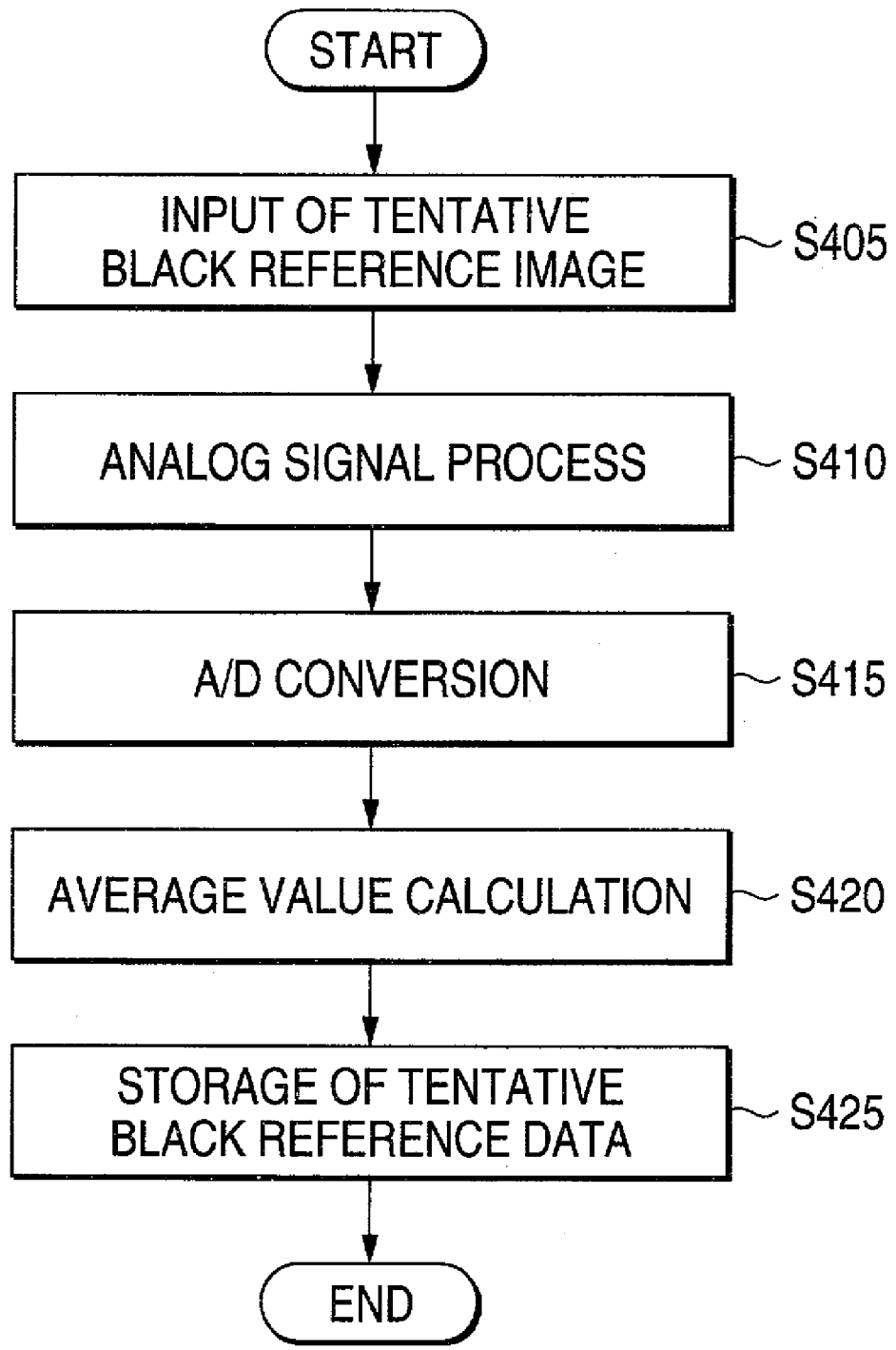
FIG. 5 is a chart explaining the operation of a first step in this embodiment.

FIG. 5 is a chart explaining the operation of the first step (step S305). The CPU 130 first causes the 60 light-shielded photosensor elements of the image sensor 20 to accumulate signal charges in the state where the transmissive-original light source 80 is lit up. Thus, a tentative black reference image is inputted (step S405). The CPU 130 causes the main scanning drive unit 102 to output the drive pulses at the predetermined intervals, so as to transfer the accumulated signal charges to the unshown shift register of the image sensor 20 and to supply the analog signal processing unit 104 with analog electric signals corresponding to one line. Incidentally, at the first step, the accumulation time of the signal charges is controlled to be shorter as compared with that of signal charges in the mode of reading the subject, by adjusting the intervals at which the drive pulses are outputted. The reason therefor is that, since the tentative black reference data are sufficiently smaller than the white reference data, the shortened accumulation time hardly affects the image quality of the image data. Subsequently, the CPU 130 controls the signal processing unit 100 so that the outputted analog electric signals may be outputted to the analog signal process by the analog signal processing unit 104 (step S410). Subsequently, the processed electric signals are converted by the A/D converter 106 into digital data (step S415), which are delivered as output values concerning the 60 photosensor elements shielded from light. The CPU 130 calculates the average value of the respective output values as to the 60 light-shielded photosensor elements (step S420), and stores the calculated average value in the predetermined location of the RAM 132 as the tentative black reference data B' (step S425).

Assuming by way of example that the output values as to the light-shielded photosensor elements B'1-B'10 of the image sensor 20 be B'1=12, B'2=13, B'3=9, B'4=16, B'5=6, B'6=19, B'7=5, B'8=20, B'9=13 and B'10=17, B'=13 is stored in the predetermined location of the RAM 132 for storing the tentative black reference data B'.

Since the tentative black reference data are sufficiently smaller relative to the white reference data, the differences of the output values of the respective photosensor elements are negligible in the setting of the tentative black reference data. Therefore, the differences of the output values of the respective photosensor elements are regarded as zero in the tentative black reference data, and an identical tentative black reference data is used for all the effective photosensor elements in the setting of the white reference data to be explained below.

Figure 6:
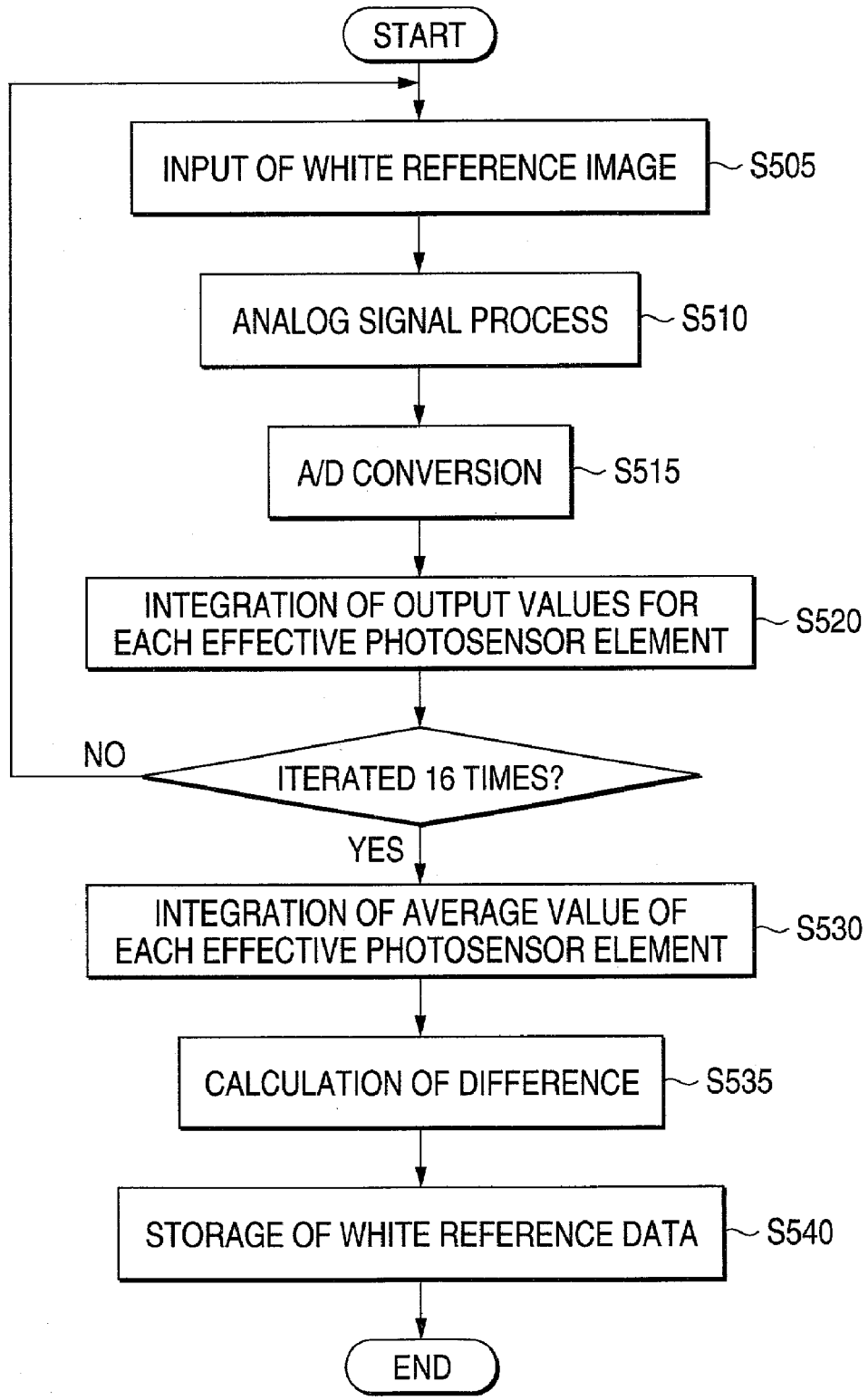
FIG. 6 is a chart explaining the operation of a second step in this embodiment.

FIG. 6 is a diagram explaining the operation of the second step (step S310). At the second step, the white reference image is first inputted. The "white reference image" signifies the optical image of the light diffusion plate 82 which is illuminated by the transmissive-original light source 80. In the state where the transmissive-original light source 80 is lit up, the CPU 130 controls the subsidiary scanning drive unit 26 so as to move the carriage 24 to a predetermined white reference reading position. Thus, the optical image of the light diffusion plate 82 is focused on the image sensor 20 by the optical system 30, and the signal charges in quantities correlative to entering light quantities are accumulated in the effective photosensor elements of the image sensor 20. Thus, the white reference image is inputted (step S505). The CPU 130 causes the main scanning drive unit 102 to output the drive pulses at the predetermined intervals, so as to transfer the accumulated signal charges to the unshown shift register of the image sensor 20 and to supply the analog signal processing unit 104 with analog electric signals corresponding to one line. Subsequently, the CPU 130 controls the signal processing unit 100 so that the outputted analog electric signals may be outputted to the analog signal process by the analog signal processing unit 104 (step S510). Subsequently, the processed electric signals are converted by the A/D converter 106 into digital data, which are delivered as output values concerning the effective photosensor elements (step S515). Subsequently, the CPU 130 integrates the output values every effective photosensor element (step S520). The above processing of the steps S505 to S520 is executed iteratively a predetermined number of times. In this embodiment, the processing is iterated and executed 16 times, so that the output values as to each effective photosensor element are integrated 16 times. The CPU 130 divides the output value integrated every effective photosensor element, by the number of input times (n=16) of the white reference image, thereby to calculate the average value W of the output data of each effective photosensor element (step S530). Further, it calculates the difference W'=W−B' of each effective photosensor element from the calculated average value W of each effective photosensor element and the tentative black reference data B' (step S535), and it stores the calculated difference W' of each effective photosensor element in the predetermined location of the RAM 132 as the white reference data (step S540).

Assuming by way of example that the average values of the output values of the respective effective photosensor elements W1 to W10 of the image sensor 20 be W1=242, W2=243, W3=239, W4=246, W5=236, W6=249, W7=235, W8=250, W9=243 and W10=240, and that the tentative black reference data B' stored in the predetermined location of the RAM 132 be 13, then W'1=229, W'2=230, W'3=226, W'4=233, W'5=223, W'6=236, W'7=222, W'8=237, W'9=230 and W'10=227 are stored in the predetermined locations W'1 to W'10 of the RAM 132 for storing the white reference data.

The fact that the white reference data is stored in terms of the difference between the average value of the output values W of each effective photosensor element and the tentative black reference data B' as stated above, is based on a reason stated below. In case of implementing shading corrections, a correction is made in conformity with the following correcting formula:

Correcting formula $x' = a(x-b)/(w-b')$

In the above correcting formula, x denotes the output value (digital data) of the pertinent photosensor element, and x' denotes a value after the correction. w denotes the white reference data of the pertinent photosensor element. b denotes the black reference data of the pertinent photosensor element, and b' denotes the tentative black reference data. a denotes a constant, which is 255 ($=2^8-1$) in case of processing with 8 bits and 65535 ($=2^{16}-1$) in case of processing with 16 bits. Since the denominator (w−b') is constant every photosensor element during the image reading step, the difference W' (=w−b') may be computed only once at the setting of the white reference data. Thus, a computing time period for the correction is shortened.

Incidentally, although the tentative black reference image and the white reference image are separately inputted at the first step and the second step in this embodiment, respectively, they may well be inputted at one time.

Figure 7:
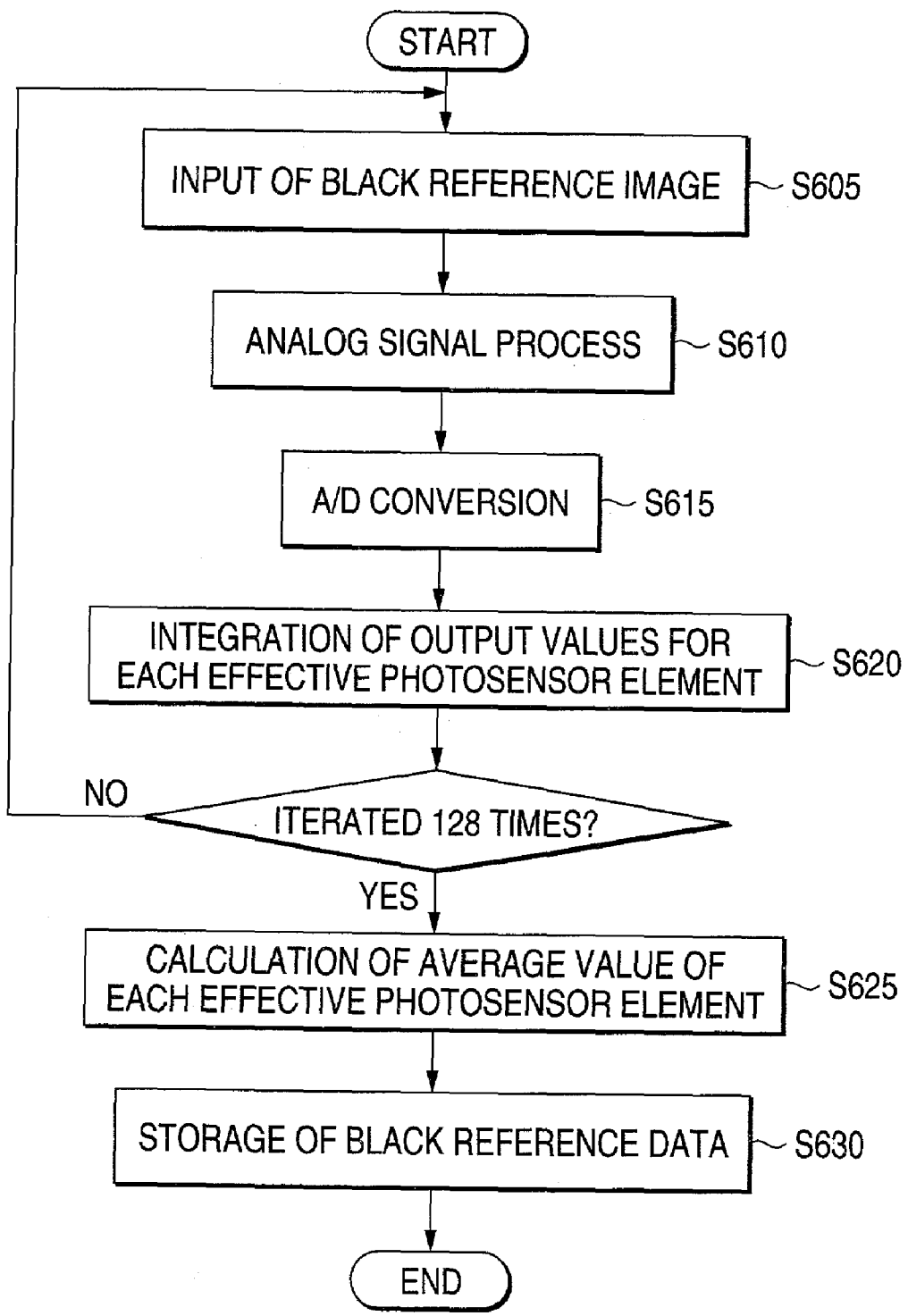
FIG. 7 is a chart explaining the operation of setting the black reference data in this embodiment.

FIG. 7 is a chart explaining the operation of the setting of the black reference data (steps S315 and S320). In the setting of the black reference data, the black reference image is first inputted. In the state where the transmissive-original light source 80 is lit up, the CPU 130 causes the effective photosensor elements of the image sensor 20 to accumulate the signal charges. Thus, the black reference image is inputted (step S605). The CPU 130 causes the main scanning drive unit 102 to output the drive pulses at the predetermined intervals, so as to transfer the accumulated charges to the unshown shift register of the image sensor 20 and to supply the analog signal processing unit 104 with analog electric signals corresponding to one line. Incidentally, the CPU 130 controls the output intervals of the drive pulses to the same intervals as in the case of reading the subject image, whereby the accumulation time of the signal charges in the case of inputting the black reference image is equalized to the accumulation time in the case of reading the subject image. Subsequently, the CPU 130 controls the signal processing unit 100 so that the outputted analog electric signals may be outputted to the analog signal process by the analog signal processing unit 104 (step S610). Subsequently, the processed electric signals are converted by the A/D converter 106 into digital data, which are delivered as output values concerning the effective photosensor elements (step S615). Subsequently, the CPU 130 integrates the output values every effective photosensor element (step S620). The above processing of the steps S605 to S620 is executed iteratively a predetermined number of times. In this embodiment, the processing is executed 128 times, so that the output values as to each effective photosensor element are integrated 128 times. The CPU 130 divides the output value integrated every effective photosensor element, by the number of input times (n=128) of the black reference image, thereby to calculate the average value of the output data of each effective photosensor element (step S625). Lastly, it stores the calculated average value of each effective photosensor element in the predetermined location of the RAM 132 as the black reference data B (step S630).

The fact that the black reference image is inputted 128 times in this embodiment, is based on a reason stated below. In the state where the light to fall on the image sensor is intercepted, the output values of the electric signals which are outputted as to the respective effective photosensor elements of the image sensor exhibit a discrepancy on the order of 1 mV . . . . On the other hand, random noise which develops in each photosensor element of the image sensor is on the order of 10 mV. Therefore, unless the random noise developing from each effective photosensor element of the image sensor is reduced to, at least, 1/10, it is impossible to accurately find the output data as to the respective effective photosensor elements in the state where the entering light is intercepted, that is, dark-mode outputs. Letting n denote the number of times for inputting the black reference image in the case where the averaging process is performed, the random noise can be reduced to $1/(n^{1/2})$. In order to reduce the random noise to 1/10, accordingly, the number of times n for inputting the black reference image needs to be set at 100 or above. Besides, considering the internal processing of data in the signal processing unit 100, the number of times for inputting the black reference image should desirably become $2^m$ (m being an integer) In this embodiment, therefore, the number of times for inputting the black reference image is set at $2^7=128$.

Figure 8:
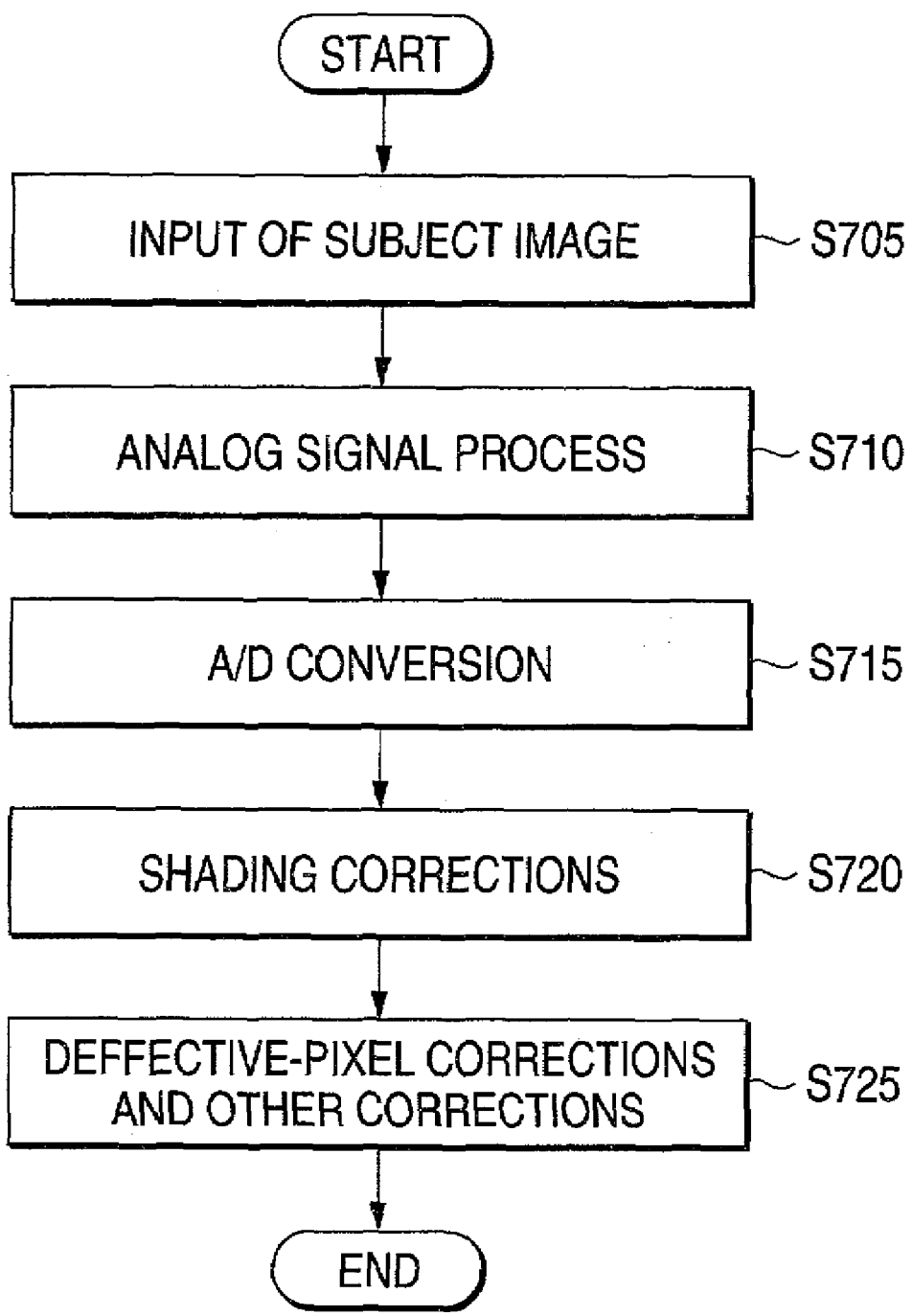
FIG. 8 is a chart explaining the operation of reading a subject in this embodiment.

Incidentally, regarding the storage of the black reference data, the average values of the respective effective photosensor elements are directly stored as the black reference data in this embodiment. However, the storage area of the black reference data may well be relieved by utilizing offset values FIG. 8 is a diagram explaining the operation of the processing (step S330) of reading the subject. In the state where the transmissive-original light source 80 is lit up, the CPU 130 controls the subsidiary scanning drive unit 26 so as to move the carriage 24 to a predetermined subject reading position. Incidentally, the movement of the carriage 24 may well be performed beforehand at any time between the end of the processing of the first step (step S305) and the start of the reading process. Thus, the subject image is focused on the image sensor 20 by the optical system 30, and the signal charges in quantities correlative to the density of entering light quantities are accumulated in the effective photosensor elements of the image sensor 20. Thus, the subject image is inputted (step S705). The CPU 130 causes the main scanning drive unit 102 to output the drive pulses at the predetermined intervals, so as to transfer the accumulated charges to the unshown shift register of the image sensor 20 and to supply the analog signal processing unit 104 with analog electric signals corresponding to one line. Subsequently, the CPU 130 controls the signal processing unit 100 so that the outputted analog electric signals may be outputted to the analog signal process by the analog signal processing unit 104 (step S710). Subsequently, the processed electric signals are converted by the A/D converter 106 into digital data, which are outputted to the digital signal processing unit 108 (step S715). The shading corrections are implemented for output values as to the respective effective photosensor elements having produced outputs, by the shading correction unit of the digital signal processing unit 108. The shading correction unit loads the white reference data and black reference data of the respective effective photosensor elements as stored in the predetermined location of the RAM 132, and corrects the output values of the respective effective photosensor elements in conformity with the correcting formula mentioned before (step S720). The digital signal processing unit 108 further outputs the corrected output values to various digital signal processes such as gamma corrections and pixel interpolations, so as to output image data (step S725). The CPU 130 iterates the above processing steps while moving the carriage 24 in the subsidiary scanning direction at a constant speed through the control of the subsidiary scanning drive unit 26. Thus, the subject is read.

Thus far, the operations incarnating the individual processes in FIG. 1 have been described. The advantages of the image scanner 10 in this embodiment will be described below.

According to the image scanner 10 of this embodiment, the white reference data are set, and the black reference data are thereafter set. Thus, it is permitted to start the scanning of the subject before the stabilization of the luminous intensity of the transmissive-original light source 80, and to shorten a time period which is required since the start of the setting of the reference data for use in the shading corrections, till the start of the reading of the subject.

Besides, in this embodiment, the quality of the image data is not degraded even when the scanning of the subject is started before the stabilization of the luminous intensity of the transmissive-original light source 80. The reason therefor is that an image which can be read within a time period (time period h in FIG. 1) required since the start of the reading till the stabilization of the luminous intensity is a part of any end of the subject, so influence which is exerted on the quality of the image data is slight and negligible. A photographic film, for example, is usually put on the original table 14 in a state where it is held in a film holder. In this case, a subject which is read during the time period h is not the photographic film, but it is a frame part constituting the film holder, so that the quality of the image data is not affected at all in many cases. Also, by way of example, the subject is often read as previewing image data (a preview image) before the image data is outputted. In this case, an image which is read within the time period h is used as the preview image, and it has no relation with the quality of the image data which is thereafter outputted. Thus, the time period which is required since the start of the setting of the reference data for use in the shading corrections, till the start of the reading, can be shortened without degrading the quality of the image data.

Besides, in this embodiment, the time period for which the signal charges are accumulated as to the photosensor elements shielded from light is set shorter than in the case of the process for reading the subject. Thus, a time period which is expended in setting the tentative black reference data can be shortened. As a result, the time period which is required since the start of the setting of the reference data for use in the shading corrections, till the start of the reading, can be shortened still further.

Besides, in this embodiment, in the setting of the black reference data, the output values of the electric signals which are outputted as to each effective photosensor element of the image sensor 20 are detected 100 times or more. Thus, the random noise which develops from the photosensor elements can be reduced to $\frac{1}{10}$, and the influence of the random noise which is contained in the black reference data can be mitigated. As a result, the quality of the read image can be enhanced.

Thus far, the advantages of the image scanner 10 in this embodiment have been described. This embodiment has been described by taking as the example the case where the transmissive original such as photographic film is read by employing the image reading apparatus of flatbed type. The present invention, however, may well be applied to an image reading apparatus of sheet-feed type or to a case of reading the reflective original such as printed document, unlike the transmissive original. Besides, in a case where an excess exposure which is n times as long as a basic exposure time is performed in order to prevent the amplification of the noise contained in the image data, a time period which is n times longer than the basic exposure time may be spent also for the input of the black reference image. Here, the "basic exposure time" signifies an exposure time in the mode of reading the subject, and it is an exposure time (charge accumulation time) which is determined so that the maximum value of the output values delivered as to the effective photosensor elements in the case of inputting the white reference image may become a predetermined value.

Lastly, the corresponding relations between items stated in the claims and the points of this embodiment will be put in order and described below.

The "white reference image input step" stated in the claims corresponds to the step (step S505) at which, at the second step of the setting of the white reference data, and with the transmissive-original light source 80 lit up, the optical image of the light diffusion plate 82 is focused on the image sensor 20 by the optical system 30, whereby the signal charges in quantities correlative to the entering light quantities are accumulated in the effective photosensor elements of the image sensor 20.

The "white reference setting step" stated in the claims corresponds to the series of steps (steps S510 to S540) at which, at the second step of the setting of the white reference data, the analog electric signals corresponding to one line are outputted until the white reference data are stored in the RAM 132.

The "black reference image input step" stated in the claims corresponds to the step (step S605) at which the signal charges are accumulated in the effective photosensor elements of the image sensor 20 in the state where the transmissive-original light source 80 is lit up.

The "black reference setting step" stated in the claims corresponds to the series of steps (steps S610 to S630) at which the analog electric signals corresponding to one line are outputted until the black reference data are stored in the RAM 132.

The "reading step" stated in the claims corresponds to the series of processing steps (steps S705 to S725) at which, with the transmissive-original light source 80 lit up, the subject image is focused on the image sensor 20 by the optical system 30, and the signal charges in quantities correlative to the density of the entering light quantities are accumulated in the effective photosensor elements of the image sensor 20 and are outputted to the various digital signal processes such as shading corrections, gamma corrections and pixel interpolations, until the image data are outputted.

The "first step" of the "white reference setting step" as stated in the claims corresponds to the series of steps (step S305, steps S405 to S425) at which, with the transmissive-original light source 80 lit up, the signal charges are accumulated in the 60 light-shielded photosensor elements of the image sensor 20 until the tentative black reference data is stored in the predetermined location of the RAM 132.

The "second step" of the "white reference setting step" as stated in the claims corresponds to the series of steps (step S310, steps S505 to S540) at which, with the transmissive-original light source 80 lit up, the optical image of the light diffusion plate 82 is focused on the image sensor 20 by the optical system 30 until the white reference data are stored in the predetermined location of the REM 132.

The function of "controlling at the first step the accumulation time of the signal charges of the image sensor to be shorter than that of the signal charges of the image sensor at the reading step" as stated in the claims corresponds to the function of adjusting the output intervals of the drive pulses at the step S410 of the first step, whereby the accumulation time of the signal charges is controlled shorter as compared with that of the signal charges in the mode of reading the subject.

The function of "inputting the black reference image to the effective photosensor elements a plurality of times at the black reference image input step" as stated in the claims corresponds to the function of iterating 128 times the processing step (step S605) at which the signal charges are accumulated in the effective photosensor elements of the image sensor 20 in the state where the transmissive-original light source 80 is extinguished The function of "setting at the black reference setting step the black reference data on the basis of the average of the output signals of each effective photosensor element by inspecting the output signals of the image sensor a plurality of times as to the black reference image" as stated in the claims corresponds to the function (steps S610 to S630) of causing each effective photosensor element to output the analog electric signals corresponding to one line, and then calculating the average value of the output data every effective photosensor element, until the black reference data is stored in the predetermined location of the RAM 132.

The function of "inputting the black reference image to the effective photosensor elements at least 100 times at the black reference image input step" as stated in the claims corresponds to the function of iterating 128 times the processing step (step S605) of accumulating the signal charges in the effective photosensor elements of the image sensor 20 in the state where the transmissive-original light source 80 is extinguished.

The function of "inspecting the output signals of the image sensor at least 100 times as to the black reference image at the black reference setting step" as stated in the claims corresponds to the function of iterating 128 times the series of processing steps (steps S610 to S520) of causing each effective photosensor element to output the analog electric signals corresponding to one line, until the output values as to each effective photosensor element are integrated.

The "plurality of photosensor elements" included in the "image sensor" as stated in the claims correspond to the plurality of photosensor elements provided in the image sensor 20 included in the image scanner 10.

The "image sensor", "optical system" and "processing unit" included in the "image reading apparatus" as stated in the claims correspond to the image sensor 20, optical system 30 and signal processing unit 100, respectively.

What is claimed is:

1. A method of setting reference data of shading corrections comprising:
    a white reference image input step of inputting a white reference image to an image sensor with a light source lit up;
    a white reference setting step of setting white reference data every effective photosensor element by inspecting output signals of the image sensor as to the white reference image;
    a black reference image input step of inputting a black reference image to the image sensor with the light source extinguished after the white reference image input step;
    a black reference setting step of setting black reference data every effective photosensor element by inspecting output signals of the image sensor as to the black reference image; and
    a reading step of lighting up the light source after the black reference image has been inputted and before the setting of the black reference data is finished, starting inputting an optical image of a subject to the image sensor before luminous intensity of the light source is stabilized, and outputting image data outputted to the shading corrections with the white reference data and the black reference data.

2. The method according to claim 1, wherein the white reference setting step includes a first step of setting tentative black reference data by inspecting output signals with the light source lit up, as to light-shielded photosensor elements of the image sensor, and a second step of setting the white reference data with the tentative black reference data.

3. The method according to claim 2, wherein at the first step of the white reference setting step, an accumulation time of signal charges of the image sensor is controlled to be shorter than that of signal charges of the image sensor at the reading step.

4. The method according to claim 1, wherein at the black reference image input step, the black reference image is inputted to the effective photosensor elements a plurality of times; and at the black reference setting step, the output signals of the image sensor are inspected a plurality of times as to the black reference image, and the black reference data are set on the basis of an average of the output signals of each effective photosensor element.

5. The method according to claim 4, wherein at the black reference image input step, the black reference image is inputted to the effective photosensor elements at least 100 times; and at the black reference setting step, the output signals of the image sensor are inspected at least 100 times as to the black reference image.

6. An image reading apparatus comprising:
an image sensor which includes a plurality of photosensor elements;
an optical system which includes a light source for illuminating a subject, and which inputs an optical image to the image sensor;
a processing unit which outputs image data expressive of the optical image on the basis of output signals of the image sensor,
a white reference image input unit for inputting a white reference image to the image sensor with the light source lit up;
a white reference setting unit for setting white reference data every effective photosensor element by inspecting the output signals of the image sensor as to the white reference image;
a black reference image input unit for inputting a black reference image to the image sensor with the light source extinguished after the white reference image has been inputted;
a black reference setting unit for setting black reference data every effective photosensor element by inspecting the output signals of the image sensor as to the black reference image; and
a reading unit configured for lighting up the light source after the black reference image has been inputted and before the setting of the black reference data is finished, starting inputting the optical image of the subject to the image sensor before luminous intensity of the light source is stabilized, and causing the processing unit to output the image data outputted to shading corrections with the white reference data and the black reference data.

7. The image reading apparatus according to claim 6, wherein, the image sensor includes photosensor elements which are shielded from light; and the white reference setting unit sets tentative black reference data by inspecting output signals with the light source lit up, as to the light-shielded photosensor elements, and sets the white reference data with the tentative black reference data.

8. The image reading apparatus according to claim 7, wherein the white reference setting unit controls an accumulation time of signal charges of the image sensor to be shorter than that of the image sensor when the reading unit inspects the output signals of the image sensor as to the light-shielded photosensor elements.

9. The image reading apparatus according to claim 6, wherein the black reference image input unit inputs the black reference image to the effective photosensor elements a plurality of times; and the black reference setting unit inspects the output signals of the image sensor a plurality of times as to the black reference image, and sets the black reference data on the basis of an average of the output signals of each effective photosensor element.

10. The image reading apparatus according to claim 9, wherein the black reference image input unit inputs the black reference image to the effective photosensor elements at least 100 times; and the black reference setting unit inspects the output signals of the image sensor at least 100 times as to the black reference image.

11. The method according to claim 1, wherein
in the white reference image input step, a carriage provided with the image sensor and the light source is moved to a white reference reading position after the light source is lit up.

12. The image reading apparatus according to claim 6, wherein
a carriage provided with the image sensor and the optical system is configured to move to a white reference reading position after the light source is lit up by the white reference image input unit.

* * * * *